United States Patent [19]
Mertens et al.

[11] Patent Number: 5,152,363
[45] Date of Patent: Oct. 6, 1992

[54] ANTI-THEFT AUTOMOTIVE STEERING SYSTEM

[75] Inventors: Theobald Mertens, Niederfischbach; Dieter Simon, Bad Kreuznach, both of Fed. Rep. of Germany

[73] Assignee: General Motors Corporation, Detroit, Mich.

[21] Appl. No.: 752,353

[22] Filed: Sep. 3, 1991

[30] Foreign Application Priority Data

Sep. 19, 1990 [DE] Fed. Rep. of Germany ....... 4029604

[51] Int. Cl.⁵ .............................. B60R 25/02
[52] U.S. Cl. ...................... 180/287; 280/771; 70/218; 70/252
[58] Field of Search ............. 280/771; 180/287; 70/207, 218, 252, 253

[56] References Cited

U.S. PATENT DOCUMENTS

| | | | |
|---|---|---|---|
| 4,258,560 | 3/1981 | Jessop | 70/252 |
| 4,589,513 | 5/1986 | Proffitt | 180/287 |
| 4,606,426 | 8/1986 | de la Orden Azuaga | 180/287 |
| 4,811,580 | 3/1989 | Jang | 70/218 |
| 4,934,479 | 6/1990 | Usina | 180/287 |

FOREIGN PATENT DOCUMENTS 3905183 9/1989 Fed. Rep. of Germany .

Primary Examiner—Kenneth R. Rice
Attorney, Agent, or Firm—Saul Schwartz

[57] ABSTRACT

The invention pertains to a theftproofing system for motor vehicles with a locking member which can be engaged in a recess of a closing ring arranged concentrically to a steering shaft (9) and firmly connected to it and, when the locking member is engaged, blocks the steering shaft until a limiting torque is introduced into it.

According to the invention, it is proposed that, in the frictional connection between the steering wheel (steering wheel spoke 5) and steering shaft, a slip clutch (3, 4, 8) be provided whose transmittable torque is lower than the limiting torque.

5 Claims, 1 Drawing Sheet

ANTI-THEFT AUTOMOTIVE STEERING SYSTEM

FIELD OF THE INVENTION

The invention pertains to a theftproofing system for motor vehicles with a locking member which can be engaged in a recess of a closing ring arranged concentrically to a steering shaft and firmly connected to it and which, when the locking member is engaged, blocks the steering shaft until a limiting torque is applied to it.

BACKGROUND OF THE INVENTION

Most theftproofing systems today consist of a combination of an ignition-starter lock and a mechanism which blocks the steering. The mechanism, when or after the ignition key is removed, pushes the locking member into the recess of the locking ring firmly connected to the steering shaft. A disadvantage is the fact that the theftproofing system can be overcome by the use of force by introducing external forces through the steering wheel into the steering shaft which lie above the limiting torque and thus remove the block, which destroys the locking member or breaks out the recess in the closing ring. Another disadvantage is the fact that, in the case of theft, the entire steering mechanism is damaged and, if the car is ever recovered, the steering can only be repaired at great cost.

From German patent DE 39 05 183 A1 a theftproofing system for motor vehicles is known in which the steering wheel has another lock and a locking device which can be brought into the active position by the steering shaft in such a way that the lock in a first position creates a rotation-proof connection between the steering wheel and the steering shaft, and in a second position this rotation-proof connection is broken. Motor vehicles displaying conventional theftproofing systems can be additionally equipped by this other theftproofing system which is intended exclusively for the steering wheel.

SUMMARY OF THE INVENTION

The objective of the present invention is to modify a theftproofing system of the type mentioned in such a way that a destruction of the theftproofing system by the application of force through the steering wheel is effectively prevented without requiring a separate lock to lock the steering wheel.

The problem is solved with a theftproofing system of the type mentioned by the fact that a slip clutch is provided with a frictional connection between the steering wheel and the steering shaft whose transmittable torque is lower than the limiting torque. With such a theftproofing system, the introduction of a torque capable of destroying the locking member and the recess in the closing ring by means of the steering wheel is excluded because the steering wheel moves relative to the steering shaft already before reaching the limiting torque.

According to another version of the invention, it is provided that an internal ring element of the steering wheel is mounted axially in a stationary manner with respect to the steering shaft and capable of rotation relative to it, and that a bearing bushing is firmly connected to the steering shaft, the bearing bushing receiving a nonrotating pressure plate capable of displacement axially with respect to it, as well as a friction coating between the latter and a ring element, and on the side of the compression spring facing away from the friction coating, a covering element connected to the bearing bushing or steering shaft is arranged, and at least one compression spring is arranged between this and the pressure plate. Such a configuration makes it possible to integrate the slip clutch into the central region of the steering wheel, i.e., the steering wheel hub in such a way that motor vehicles equipped with the theftproofing system according to the invention can be reequipped by replacing the steering wheel alone. Advisably, several compression springs, in particular two compression springs, are provided which are designed as plate springs arranged in the form of a packet and which enclose the bearing bushing. It is precisely the design of the compression springs as plate springs which results in a smaller construction space for the slip clutch at the maximal transmittable torque. Advantageously, the ring element is designed as a ring plate extending in the radial direction, in which case in the region of its outer circumference, it is connected to a sleeve extending perpendicularly from it in the direction of the covering element, and the covering element is capable of being screwed onto the bearing bushing and is introduced into the sleeve in the screwed-on position.

Other features of the invention are shown in the description of the figures and in the subclaims, all of the individual features and all combinations of individual features being essential according to the invention.

BRIEF DESCRIPTION OF THE DRAWINGS

In the figures the invention is illustrated by way of an embodiment without being limited to it.

The figures show.

DESCRIPTION OF PREFERRED EMBODIMENT

Figure 1:
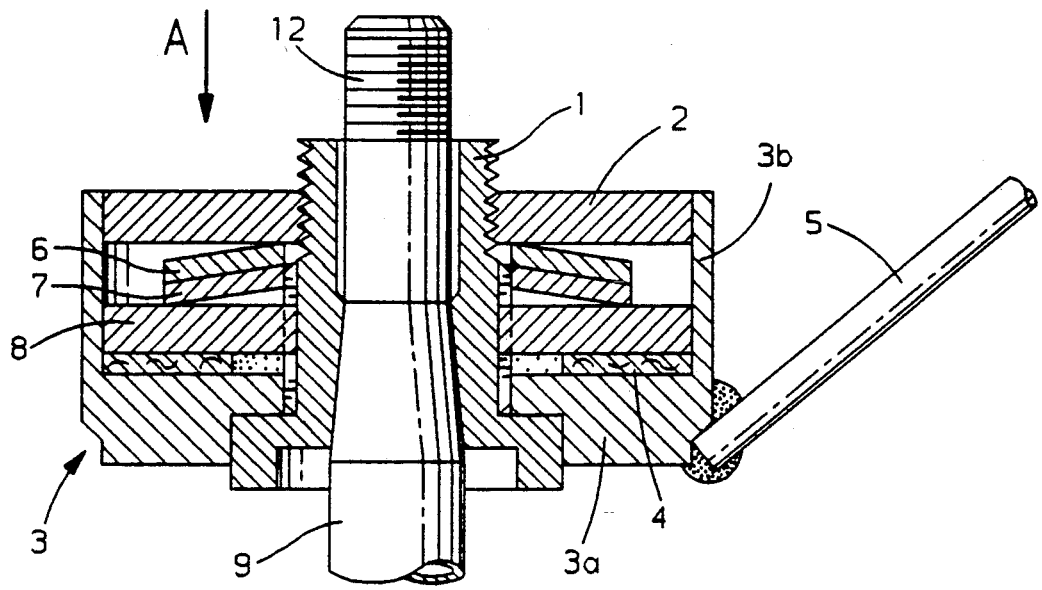
FIG. 1, a central longitudinal section through a steering wheel connected to a steering shaft shown in the region of the hub, which is provided with a theftproofing system according to the invention.
Figure 2:
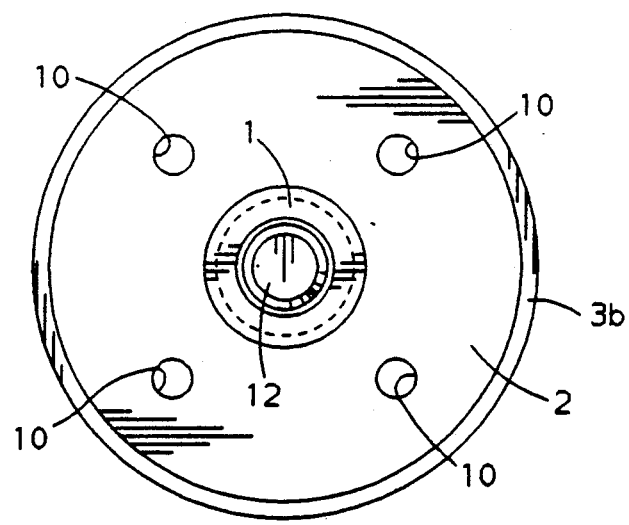
FIG. 2, a view A according to FIG. 1.
Figure 3:
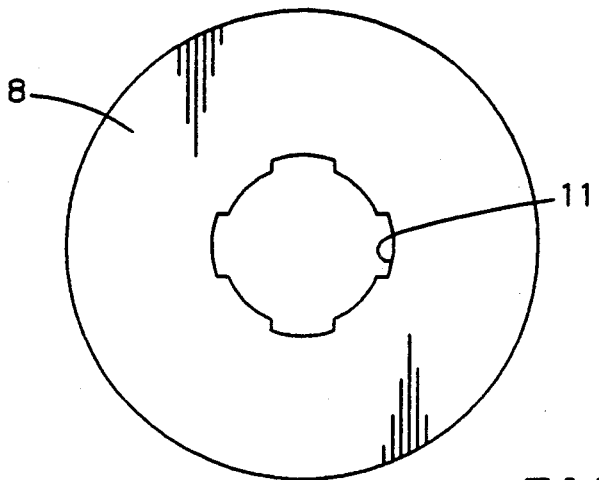
FIG. 3, a top view of a pressure plate of the slip clutch.

The representation of FIG. 1 shows the theftproofing system according to the invention in the hub region of the steering wheel. Not illustrated is the other generally known theftproofing system controlled by the steering wheel lock which has a locking member which can be engaged in a recess of a slot ring arranged concentrically to the steering shaft 9 and firmly connected to it so that when the locking member is engaged, the steering shaft 9 is blocked until the appearance of a limiting torque introduced into it.

As FIG. 1 shows, the theftproofing system according to the invention has an internal ring element 3 of the steering wheel shown otherwise only by one spoke 5, the ring element 3 being firmly held axially with respect to the steering shaft 9 and mounted capable of rotation relative to it. A bearing bushing 1 is firmly connected to the steering shaft 9, in which case the bearing bushing 1 receives a rotation-proof and axially displaceable pressure plate 8. Between the pressure plate 8 and the ring element 3 a friction coating 4 is arranged on which, on the side of the pressure plate 8 facing away from the friction coating 4, a covering element 2 connected to the bearing bushing 1 is located. Two plate springs 6 and 7 arranged in the form of a packet surround the bearing bushing 1 and are supported between the covering element 2 and the pressure plate 8 acting on the friction coating 4. The ring element 3 is designed as a radially extending ring plate 3a, in which case a sleeve 3b is connected to the ring plate 3a in the region of its outer circumference, said sleeve extending perpendicularly from the latter in the direction of the covering element 2. The friction coating 4 is connected to the ring plate 3a. The covering element 2 can be screwed onto the bearing bushing 1 and is inserted into the sleeve 3b in the screwed-on position. To screw on and tighten the covering element 2, the latter is provided with 4 dead-end holes 10 on its side facing away from the plate springs 6 and 7, into which a tool with prongs corresponding in shape to the recesses 10 is inserted. The torque transmission between the bearing bushing 1 and the pressure plate 8 is accomplished by frictional engagement of 4 wedge shoulders on the bearing bushing 1 in the correspondingly shaped groves 11 of the pressure plate 8.

In the theftproofing system described, the flow of force on the steering wheel side takes place via the steering wheel spokes 5 to the ring element 3 with the friction coating 4, from there, on the basis of the pressing force initiated via the plate springs 6 and 7 in the pressure plate 8, into the pressure plate 8 and from there into the bearing bushing 1 connected to it in a rotation-proof manner. The latter is plugged with its inner cone onto the outer cone of the steering shaft 9 and the torque is transmitted by tightening the cone surfaces by screwing a screw, not shown, onto the threaded end region 12 of the steering shaft 9. The transmittable torque between the bearing bushing 1 and the steering shaft 9 is greater than the limiting torque initiated by the locking member into the steering shaft 9 while, conversely, the transmittable torque between the steering wheel and the bearing bushing 1 is lower than the limiting torque. When external violent force is applied to the steering wheel, the latter slips before reaching the limiting torque because of the slip clutch formed in the region of the steering hub and prevents damage to the theftproofing system in the region of the locking member.

The embodiments of the invention in which an exclusive property or privilege is claimed are defined as follows:

1. An automotive steering system comprising:
   a steering shaft,
   a steering wheel,
   an anti-theft locking means operative to rotationally immobilize said steering shaft until an applied torque on said steering shaft exceeds a first magnitude, and
   an automatic slip clutch between said steering shaft and said steering wheel connecting said steering wheel to said steering shaft for unitary rotation and releasing said steering wheel for rotation independent of said steering shaft when an applied torque on said steering wheel exceeds a second magnitude less than said first magnitude.

2. The automotive steering system recited in claim 1 wherein said automatic slip clutch between said steering shaft and said steering wheel includes,
   means on said steering shaft defining an annular shoulder in a plane perpendicular to a longitudinal centerline of said steering shaft,
   means mounting said steering wheel on said steering shaft for rotation relative thereto about said longitudinal centerline and abutting said annular shoulder,
   means on said steering wheel defining a ring plate in a plane perpendicular to said longitudinal centerline rotatable as a unit with said steering wheel,
   a pressure plate,
   means mounting said pressure plate on said steering shaft in a plane perpendicular to said longitudinal centerline for rotation as a unit with said steering shaft and for bodily movement relative thereto in the direction of said longitudinal centerline,
   friction means between said ring plate and said pressure plate, and
   spring means between said steering shaft and said pressure plate biasing said pressure plate against said ring plate with said friction means therebetween and biasing said ring plate against said annular shoulder.

3. The automotive steering system recited in claim 2 wherein
   said means on said steering shaft defining an annular shoulder in a plane perpendicular to a longitudinal centerline of said steering shaft includes,
   a bushing having an internal bore with a frustoconical wall portion,
   means on said steering shaft defining a frustoconical wall portion receiving thereon said frustoconical wall portion of said internal bore in said bushing whereby said bushing is rigidly connected to said steering shaft, and
   means on said bushing defining an annular shoulder in a plane perpendicular to said longitudinal centerline of said steering shaft.

4. The automotive steering system recited in claim 3 wherein
   said means mounting said plate on said steering shaft in a plane perpendicular to said longitudinal centerline for rotation as a unit with said steering shaft and for bodily movement relative thereto in the direction of said longitudinal centerline includes,
   means on said bushing defining a plurality of wedge shoulders parallel to said longitudinal centerline, and
   means on said pressure plate defining a corresponding plurality of grooves slidably receiving corresponding ones of said wedge shoulders on said bushing.

5. The automotive steering system recited in claim 4 wherein
   said spring means between said steering shaft and said pressure plate includes,
   an annular covering element rigidly attached to said bushing parallel to said pressure plate and to said ring plate, and
   a pair of annular plate springs disposed in compression between said pressure plate and said annular covering element.

* * * * *